United States Patent
Kim et al.

(10) Patent No.: US 9,064,472 B2
(45) Date of Patent: Jun. 23, 2015

(54) LIQUID CRYSTAL DISPLAY AND METHOD THEREOF

(75) Inventors: Yoon-Jang Kim, Suwon-si (KR);
Seong-Young Lee, Anyang-si (KR);
Yeong-Keun Kwon, Suwon-si (KR);
Kee-Bum Park, Cheonan-si (KR);
Kyung-Ho Park, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1113 days.

(21) Appl. No.: 12/480,931

(22) Filed: Jun. 9, 2009

(65) Prior Publication Data

US 2010/0066658 A1 Mar. 18, 2010

(30) Foreign Application Priority Data

Sep. 18, 2008 (KR) .......................... 10-2008-0091658

(51) Int. Cl.
*G09G 3/36* (2006.01)
*G02F 1/1362* (2006.01)
*G02F 1/1343* (2006.01)

(52) U.S. Cl.
CPC ............ *G09G 3/3659* (2013.01); *G09G 3/3688* (2013.01); *G02F 1/136213* (2013.01); *G02F 2001/134345* (2013.01); *G09G 3/3677* (2013.01); *G09G 2300/0426* (2013.01); *G09G 2300/0443* (2013.01); *G09G 2300/0842* (2013.01); *G09G 2300/0852* (2013.01); *G09G 2310/0205* (2013.01); *G09G 2320/028* (2013.01)

(58) Field of Classification Search
USPC ........................................... 345/87
See application file for complete search history.

(56) References Cited

U.S. PATENT DOCUMENTS

| | | | | |
|---|---|---|---|---|
| 5,337,173 | A * | 8/1994 | Atsumi et al. | 349/39 |
| 6,850,305 | B2 | 2/2005 | Hsieh et al. | |
| 7,773,185 | B2 * | 8/2010 | Bae et al. | 349/144 |
| 7,973,864 | B2 * | 7/2011 | Kim | 349/38 |
| 2003/0227429 | A1 * | 12/2003 | Shimoshikiryo | 345/90 |
| 2008/0024689 | A1 * | 1/2008 | Ahn | 349/43 |
| 2008/0117154 | A1 | 5/2008 | Yeh | |
| 2009/0295693 | A1 * | 12/2009 | Yeom et al. | 345/88 |
| 2010/0123843 | A1 * | 5/2010 | Kim et al. | 349/39 |
| 2010/0225841 | A1 * | 9/2010 | Park et al. | 349/48 |
| 2011/0096260 | A1 * | 4/2011 | Cho et al. | 349/41 |
| 2011/0096282 | A1 * | 4/2011 | Cho et al. | 349/144 |

FOREIGN PATENT DOCUMENTS

| | | |
|---|---|---|
| JP | 06148676 A | 5/1994 |
| JP | 10197894 | 7/1998 |
| JP | 2001282201 | 10/2001 |
| JP | 2002303873 A | 10/2002 |
| JP | 2005189804 | 7/2005 |
| JP | 2005292397 | 10/2005 |
| KR | 1020030095260 A | 12/2003 |
| KR | 1020050018520 A | 2/2005 |

(Continued)

*Primary Examiner* — Kathy Wang-Hurst
*Assistant Examiner* — Joseph Fox
(74) *Attorney, Agent, or Firm* — Cantor Colburn LLP

(57) ABSTRACT

A liquid crystal display ("LCD") has first, second, and third pixels adjacent to one another in a column direction. The LCD includes a first gate line connected to each of the second and third pixels in common, a capacitance electrode line connected to each of the first and second pixels in common, a first data line connected to the second pixel, and a second data line connected to the first and third pixels.

18 Claims, 9 Drawing Sheets

(56) References Cited

FOREIGN PATENT DOCUMENTS

| KR | 1020070009328 | 1/2007 |
| KR | 1020070031643 | 3/2007 |
| KR | 1020070071319 | 7/2007 |
| KR | 1020070082767 | 8/2007 |
| KR | 1020080010987 A | 1/2008 |
| KR | 100806894 | 2/2008 |
| KR | 1020080044434 | 5/2008 |

* cited by examiner

LIQUID CRYSTAL DISPLAY AND METHOD THEREOF

This application claims priority to Korean Patent Application No. 10-2008-0091658, filed on Sep. 18, 2008, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display ("LCD") and method thereof. More particularly, the present invention relates to an LCD that can adjust different voltages of sub-pixels while ensuring an aperture ratio, and a method of improving an aperture ratio of the LCD.

(b) Description of the Related Art

A liquid crystal display ("LCD") is one of the most widely used flat panel displays. The LCD includes two display panels provided with electric field generating electrodes, such as pixel electrodes and a common electrode, and a liquid crystal layer interposed between the two display panels. In the LCD, voltages are applied to the electric field generating electrodes to generate an electric field in the liquid crystal layer. Due to the generated electric field, liquid crystal molecules of the liquid crystal layer are aligned, and polarization of an incident light is controlled, thereby displaying images.

The LCD also includes switching elements connected to the respective pixel electrodes, and a plurality of signal lines such as gate lines and data lines for controlling the switching elements and applying voltages to the pixel electrodes.

Among these LCDs, a vertical alignment ("VA") mode LCD, which arranges major axes of liquid crystal molecules so as to be vertical to the display panel in the state where an electric field is not applied, has been widely used due to a high contrast ratio and a wide reference viewing angle. Here, the reference viewing angle implies a viewing angle that is 1:10 in contrast ratio, or a critical angle of gray-to-gray luminance reversion.

In order to approximate side visibility to front visibility in the VA mode LCD, a method of causing a difference in transmittance by dividing one pixel into two sub-pixels and applying different voltages to the two sub-pixels has been suggested.

An example of a method includes applying the same voltage to two sub-pixels and dropping the voltage of one sub-pixel by using a separate switching element. Meanwhile, as the size of the LCD increases, the number of signal lines also increases.

BRIEF SUMMARY OF THE INVENTION

It has been determined herein, according to the present invention, that in the conventional method of applying the same voltage to two sub-pixels and dropping the voltage of one sub-pixel by using a separate switching element, since the conventional liquid crystal display ("LCD") should be provided with a plurality of signal lines and a plurality of contact holes, the aperture ratio is low. Furthermore, it has been determined herein that when the number of gate lines among the signal lines increases in a conventional LCD, the charging time of each pixel reduces. Moreover, the charging time of each pixel in a conventional LCD further reduces during high driving.

The present invention has been made in an effort to provide an LCD for adjusting different voltages of two sub-pixels while ensuring an aperture ratio. Furthermore, the present invention provides an LCD for sufficiently ensuring a charging time of pixels. The present invention also provides a method of reducing an aperture ratio in an LCD that charges different voltages in its sub-pixels.

An exemplary embodiment of the present invention provides an LCD having first, second, and third pixels adjacent to one another in a column direction, the LCD including a first gate line connected to each of the second and third pixels in common, a capacitance electrode line connected to each of the first and second pixels in common, a first data line connected to the second pixel, and a second data line connected to the first and third pixels.

The LCD may further include a second gate line connected to the second pixel, and a third gate line connected to the third pixel.

In the LCD, each of the first to third pixels may include a pixel electrode including a first sub-pixel electrode and a second sub-pixel electrode, a first thin film transistor ("TFT") connected to the first sub-pixel electrode, a second TFT connected to the second sub-pixel electrode, and a third TFT connected to the second sub-pixel electrode. Moreover, a gate electrode of the first TFT and a gate electrode of the second TFT included in each of the second and third pixels may be connected to the first gate line, and a drain electrode of the third TFT included in each of the first and second pixels is overlapped with a capacitance electrode line.

A drain electrode of each of the first, second, and third transistors included in the second pixel may have 180° rotational symmetry with respect to a drain electrode of each of the first, second, and third transistors included in the third pixel.

The LCD may further include a semiconductor layer formed between a layer including the first to third gate lines and a layer including the first and second data lines, and the semiconductor layer may have substantially a same planar shape as the first and second data lines except for a channel of the first, second, and third TFTs.

The LCD may further include an electrode member overlapped with the capacitance electrode line and including a same material as the pixel electrode, and the electrode member may be electrically connected to a drain electrode of the third TFT.

The first and second TFTs may be simultaneously turned on, and after the first and second TFTs may be turned off, the third TFT is turned on.

The first and second TFTs included in each of the second and third pixels may be simultaneously turned on, and the third TFT included in each of the first and second pixels may be simultaneously turned on.

Another exemplary embodiment of the present invention provides an LCD having first, second, and third pixels adjacent to one another in a column direction, the LCD including a plurality of first gate lines transmitting a first gate signal, a plurality of second gate lines transmitting a second gate signal, and a plurality of data lines transmitting a data voltage. In this configuration, each of the first to third pixels includes a first sub-pixel connected to one of the first gate lines and one of the data lines and a second sub-pixel connected to the one of the first gate lines, one of the second gate lines, and the one of the data lines, the first sub-pixel includes a first switching element connected to the one of the first gate lines and the one of the data lines and a first liquid crystal capacitor and a first storage capacitor connected to the first switching element, the second sub-pixel includes a second switching element connected to the one of the first gate lines and the one of the data lines, a second liquid crystal capacitor and a second storage capacitor connected to the second switching element, a third switching element connected to the one of the second gate lines and the second liquid crystal capacitor, and a step-down capacitor connected to the third switching element, and the first sub-pixel included in each of the second and third pixels is connected to a same first gate line in the plurality of first gate lines.

The LCD may further include a step-up capacitor connected to the third switching element and the second liquid crystal capacitor.

The LCD may further include a plurality of capacitance electrode lines forming one terminal of the step-down capacitor, and the second sub-pixel included in each of the first and second pixels may be connected to a same capacitance electrode line in the plurality of capacitance electrode lines.

The first and second switching elements may be simultaneously turned on, and after the first and second switching elements may be turned off, the third switching element is turned on.

The first and second switching elements included in each of the second and third pixels may be simultaneously turned on, and the third switching element included in each of the first and second pixels may be simultaneously turned on.

The second and third pixels may have 180° rotational symmetry with respect to each other.

Another exemplary embodiment of the present invention provides a method of improving an aperture ratio of an LCD, the LCD having sub-pixels which are charged with different voltages, the method including sequentially arranging first, second, and third pixels adjacent to one another in a column direction, connecting a first gate line to each of the second and third pixels in common, connecting a capacitance electrode line to each of the first and second pixels in common, connecting a first data line to the second pixel, and connecting a second data line to the first and third pixels.

According to this configuration, it is possible to ensure an aperture ratio while differently adjusting the voltage of two sub-pixels. In addition, even in the case of performing high driving, it is possible to sufficiently ensure the charging time of the pixels.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

Figure 1:
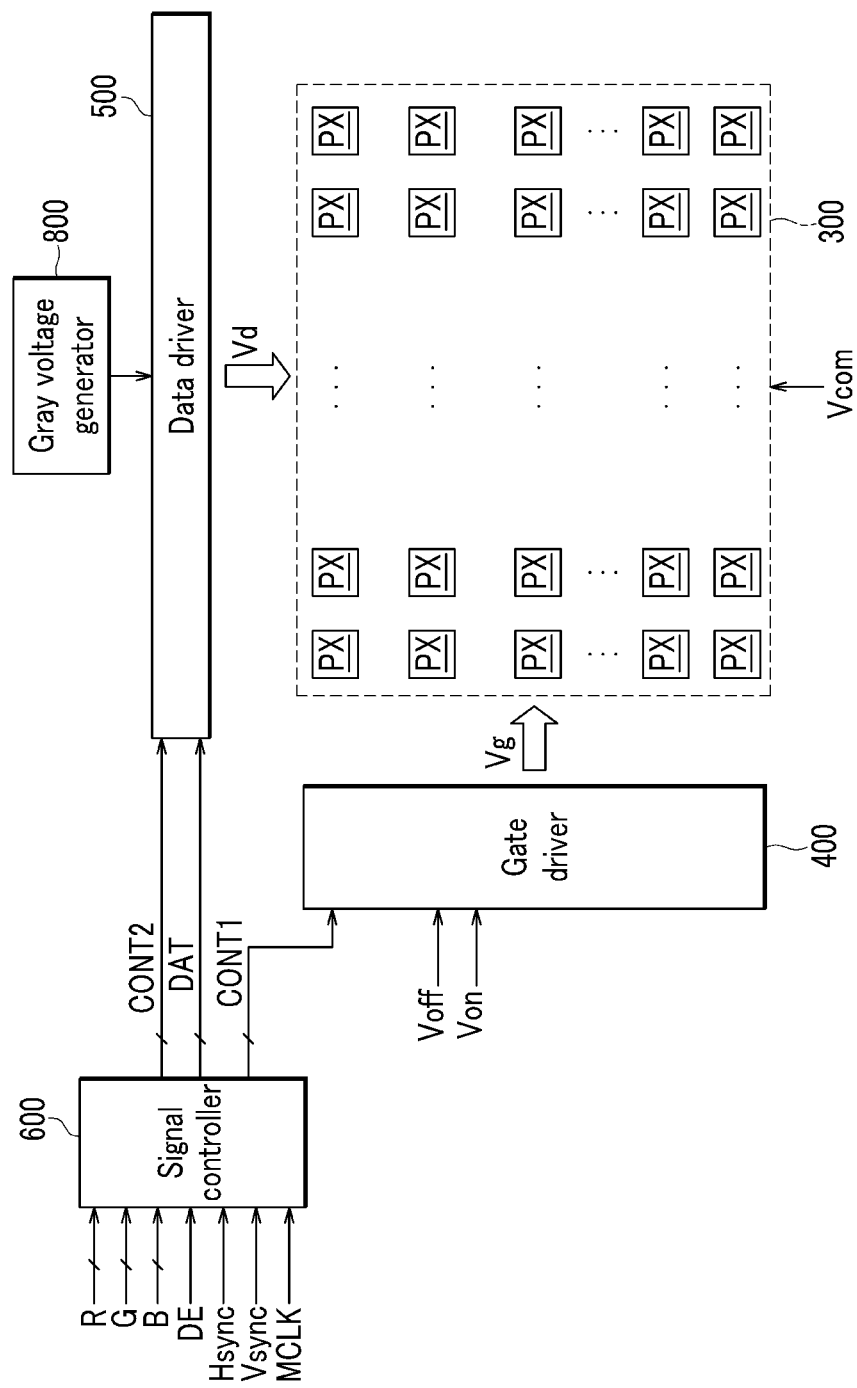
FIG. 1 is a block diagram of an exemplary LCD according to one exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

An LCD according to one exemplary embodiment of the present invention will be described more fully herein with reference to FIG. 1 to FIG. 3.

Figure 2:
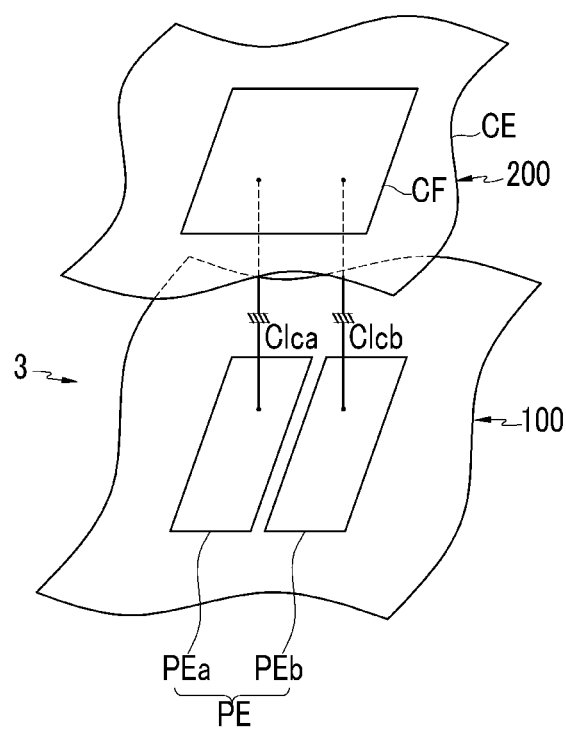
FIG. 2 is a view schematically illustrating a structure of the exemplary LCD according to one exemplary embodiment of the present invention and an equivalent circuit of two exemplary sub-pixels.
Figure 3:
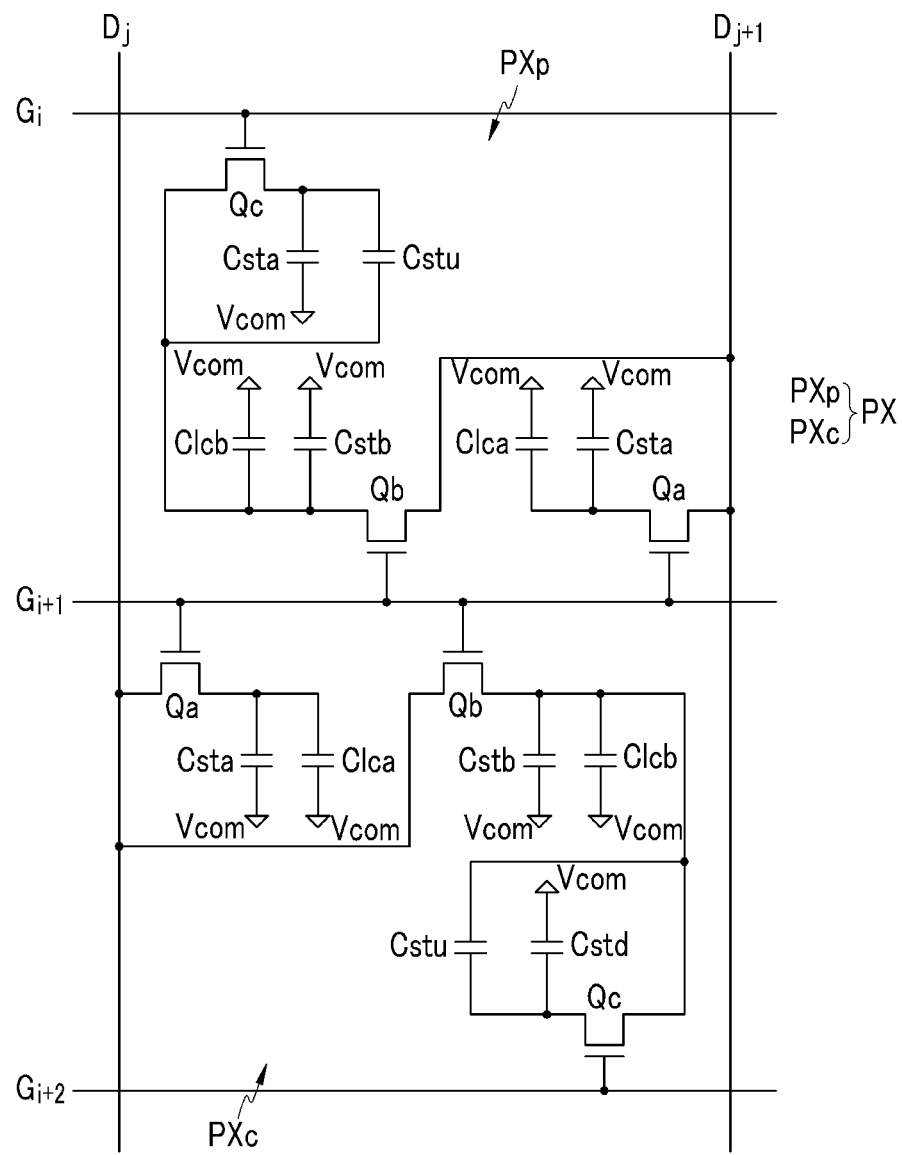
FIG. 3 is an equivalent circuit diagram of an exemplary pixel of the exemplary LCD according to one exemplary embodiment of the present invention.

FIG. 1 is a block diagram of an exemplary LCD according to one exemplary embodiment of the present invention, FIG. 2 is a view schematically illustrating a structure of the exemplary LCD according to one exemplary embodiment of the present invention and an equivalent circuit of two exemplary sub-pixels, and FIG. 3 is an equivalent circuit diagram of an exemplary pixel of the exemplary LCD according to one exemplary embodiment of the present invention.

As shown in FIG. 1, an LCD according to one exemplary embodiment of the present invention includes a liquid crystal panel assembly 300, a gate driver 400, a data driver 500, a gray voltage generator 800, and a signal controller 600.

The liquid crystal panel assembly 300, as seen from an equivalent circuit, includes a plurality of signal lines $G_i$, $G_{i+1}$, $G_{i+2}$, $D_j$, and $D_{j+1}$ (see FIG. 3) and plural pairs of upper and lower pixels PXp and PXc that are connected thereto and arranged approximately in the form of matrix. Meanwhile, as seen from the structure of FIG. 2, the liquid crystal panel assembly 300 includes a lower display panel 100 and an upper display panel 200 facing each other, and a liquid crystal layer 3 interposed therebetween.

Referring to FIG. 3, the signal line includes a plurality of gate lines $G_i$, $G_{i+1}$, and $G_{i+2}$ transmitting a gate signal (referred to as "scanning signal"), a plurality of data lines $D_j$ and $D_{j+1}$ transmitting a data voltage Vd, and a plurality of storage electrode lines (not shown). The gate lines $G_i$, $G_{i+1}$, and $G_{i+2}$ and the storage electrode lines extend in an approximate row direction, a first direction, and substantially run parallel to one another, and the data lines $D_j$ and $D_{j+1}$ extend in a column direction, a second direction substantially perpendicular to the first direction, and substantially run parallel to each other.

Each of the pixels PXp and PXc includes a pair of sub-pixels, and each of the sub-pixels includes a liquid crystal capacitor Clca and Clcb. The sub-pixels include switching elements Qa, Qb, and Qc that are connected to the gate lines $G_i$, $G_{i+1}$, and $G_{i+2}$, the data lines $D_j$ and $D_{j+1}$, and the liquid crystal capacitors Clca and Clcb.

The liquid crystal capacitors Clca and Clcb have two terminals of sub-pixel electrodes PEa and Peb, respectively, of the lower panel 100 and a common electrode CE of the upper panel 200, and the liquid crystal layer 3 functions as a dielectric material between the sub-pixel electrodes PEa and PEb and the common electrode 270. A pair of sub-pixel electrodes PEa and PEb are separated from each other to form one pixel electrode PE. The common electrode CE is formed, hereinafter "disposed", at the front of the upper panel 200 to receive a common voltage Vcom. The liquid crystal layer 3 has negative dielectric anisotropy, and liquid crystal molecules of the liquid crystal layer 3 may be aligned so that major axes thereof are vertical to the surface of the two display panels 100, 200 in the state free of an electric field. In an alternative exemplary embodiment, unlike FIG. 2, the common electrode CE may be provided on the lower panel 100. In this case, at least one of two electrodes PE and CE may be made in the form of a line or a bar.

Each pixel PX intrinsically displays one color in a set of colors, such as primary colors (spatial division) or displays the colors in turn according to time (temporal division) to cause a desired color tone to be recognized by a combination of the spatial division and the temporal division of these colors, thereby implementing a color display. An example of the primary colors may include three primary colors of red, green, and blue. One example of the spatial division is represented in FIG. 2 where each pixel PX is provided with a color filter CF indicating one of the primary colors on the region of the upper panel 200. In an alternative exemplary embodiment, unlike FIG. 2, the color filter CF may be disposed on and below the sub-pixel electrodes PEa and PEb of the lower panel 100.

Two polarizers (not shown) are provided outside of the display panels 100 and 200, respectively, and polarization axes of the two polarizers may be at right angles to each other. One of the two polarizers may be omitted in a reflective LCD. An orthogonal polarizer blocks incident light from entering the liquid crystal layer 3 in the absence of an electric field.

Referring once again to FIG. 1, the gray voltage generator 800 generates all gray voltages related to transmittance of the pixel PX or a defined number of gray voltages (hereinafter referred to as "reference gray voltages"). The reference gray voltages may have a positive value and a negative value with respect to the common voltage Vcom.

The gate driver 400 is connected to the gate lines $G_i$, $G_{i+1}$, and $G_{i+2}$ of the liquid crystal panel assembly 300 to apply gate signals formed in combination with a gate-on voltage Von and a gate-off voltage Voff to the gate lines $G_i$, $G_{i+1}$, and $G_{i+2}$.

The data driver 500 is connected to the data lines $D_j$ and $D_{j+1}$ of the liquid crystal panel assembly 300 to select a gray voltage from the gray voltage generator 800 and apply the selected gray voltage to the data lines $D_j$ and $D_{j+1}$ as a data voltage Vd. However, when the gray voltage generator 800 provides only the defined reference gray voltages instead of providing all gray voltages, the data driver 500 divides the reference gray voltages to generate a desired data voltage Vd.

The signal controller 600 controls, for example, the gate driver 400 and the data driver 500.

These driving devices 400, 500, 600, and 800 may be directly mounted on the liquid crystal panel assembly 300 in the form of at least one integrated chip ("IC") chip, may be attached to the liquid crystal panel assembly 300 in the form of a tape carrier package ("TCP") while being mounted on a flexible printed circuit ("FPC") film (not shown), or may be mounted on a separate printed circuit board ("PCB"), respectively. On the other hand, these driving devices 400, 500, 600, and 800 may be integrated with the liquid crystal panel assembly 300 together with the signal lines $G_i$, $G_{i+1}$, $G_{i+2}$, $D_j$, and $D_{j+1}$ and thin film transistor ("TFT") switching elements Qa, Qb, and Qc. Furthermore, the driving devices 400, 500, 600, and 800 may be integrated in the form of a single chip. In this case, at least one of the driving devices or at least one circuit element configuring the driving devices can be provided outside the single chip.

The liquid crystal panel assembly according to one exemplary embodiment of the present invention will be described more fully herein with reference to FIG. 4 to FIG. 7, and with additional reference to FIG. 3.

Referring to FIG. 3, the LCD according to one exemplary embodiment of the present invention includes signal lines and a pixel PX connected thereto, the signal lines including first, second, and third gate lines $G_i$, $G_{i+1}$, and $G_{i+2}$ adjacent to one another, and first and second data lines $D_j$ and $D_{j+1}$.

The pixel PX includes a lower pixel PXc and an upper pixel PXp adjacent to each other in the column direction, the second direction. First, the configuration of the lower pixel PXc will be described in detail.

The lower pixel PXc includes first, second, and third switching elements Qa, Qb, and Qc, first and second liquid crystal capacitors Clca and Clcb, first and second storage capacitors Csta and Cstb, a step-down capacitor Cstd, and a step-up capacitor Cstu.

The first and second switching elements Qa and Qb are connected to the second gate line $G_{i+1}$ and the first data line $D_j$, and the third switching element Qc is connected to the third gate line $G_{i+2}$.

The first and second switching elements Qa and Qb are three terminal elements of a TFT provided on the lower panel 100 and have a control terminal, an input terminal, and an output terminal. The control terminal, such as a gate electrode, is connected to the second gate line $G_{i+1}$, the input terminal, such as a source electrode, is connected to the first data line $D_j$, and the output terminal, such as a drain electrode, is connected to the first and second liquid crystal capacitors Clca and Clcb and the first and second storage capacitors Csta and Cstb.

The third switching element Qc is also a three terminal element of a TFT provided on the lower panel 100, and has a control terminal, an input terminal, and an output terminal. The control terminal, such as a gate electrode, is connected to the third gate line $G_{i+2}$, the input terminal is connected to the second liquid crystal capacitor Clcb, and the output terminal, such as a drain electrode, is connected to the step-down capacitor Cstd and the step-up capacitor Cstu.

The first and second storage capacitors Csta and Cstb are connected to the first and second switching elements Qa and Qb and the common voltage Vcom to perform an accessory role of the first and second liquid crystal capacitors Clca and Clcb. The first and second storage capacitors Csta and Cstb may be formed by overlapping the storage electrode line and the pixel electrode PE provided on the lower panel 100 with an insulator interposed therebetween, and a fixed voltage such as the common voltage Vcom is applied to the storage electrode line.

The step-down capacitor Cstd may be formed by overlapping the storage electrode line and the output electrode of the third switching element Qc provided on the lower panel 100 with an insulator interposed therebetween to be connected to the output terminal of the third switching element Qc and the common voltage Vcom.

The step-up capacitor Cstu may be formed by overlapping the second sub-pixel electrode PEb and the output electrode of the third switching element Qc provided on the lower panel 100 with an insulator interposed therebetween to be connected to the output terminal of the third switching element Qc and the common voltage Vcom. Capacitance of the step-up capacitor Cstu is less than that of the step-down capacitor Cstd.

Like the lower pixel PXc, the upper pixel PXp also includes the first, second, and third switching elements Qa, Qb, and Qc, the first and second liquid crystal capacitors Clca and Clcb, the first and second storage capacitors Csta and Cstb, the step-down capacitor Cstd, and the step-up capacitor Cstu.

The first and second switching elements Qa and Qb of the upper pixel PXp are connected to the same gate line, that is, the second gate line $G_{i+1}$, to which the first and second switching elements Qa and Qb of the lower pixel PXc are connected. That is, the second gate line $G_{i+1}$ disposed between the lower and upper pixels PXc and PXp is connected to the lower and upper pixels PXc and PXp in common. The first and second switching elements Qa and Qb of the upper pixel PXp are connected to the second data line $D_{j+1}$ adjacent to the first data line $D_j$. Meanwhile, the third switching element Qc of the upper pixel PXc is connected to the first gate line $G_i$ facing the second gate line $G_{i+1}$. Ultimately, the lower pixel PXc and the upper pixel PXp have 180° rotational symmetry to each other.

The liquid crystal panel assembly according to one exemplary embodiment of the present invention will be described more fully herein with reference to FIG. 4 to FIG. 6.

Figure 4:
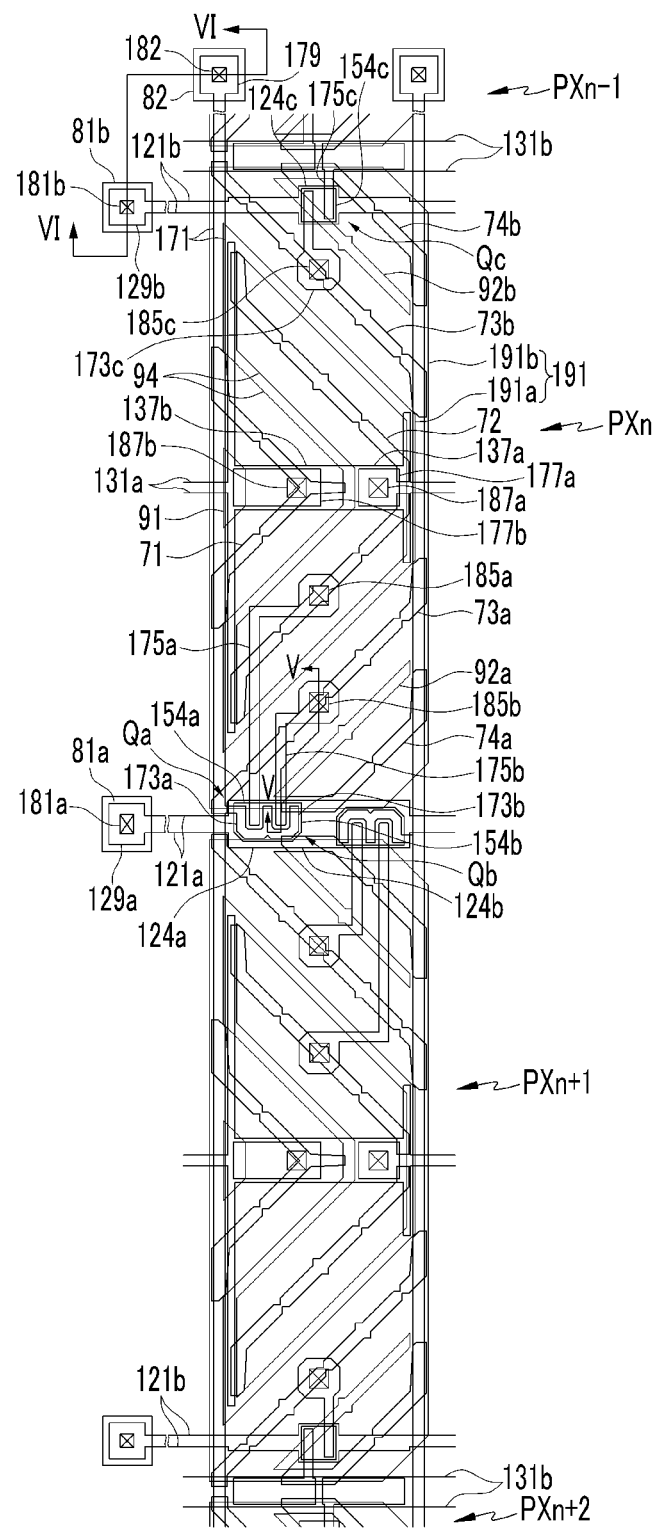
FIG. 4 is a layout view of an exemplary liquid crystal panel assembly according to one exemplary embodiment of the present invention.
Figure 5:
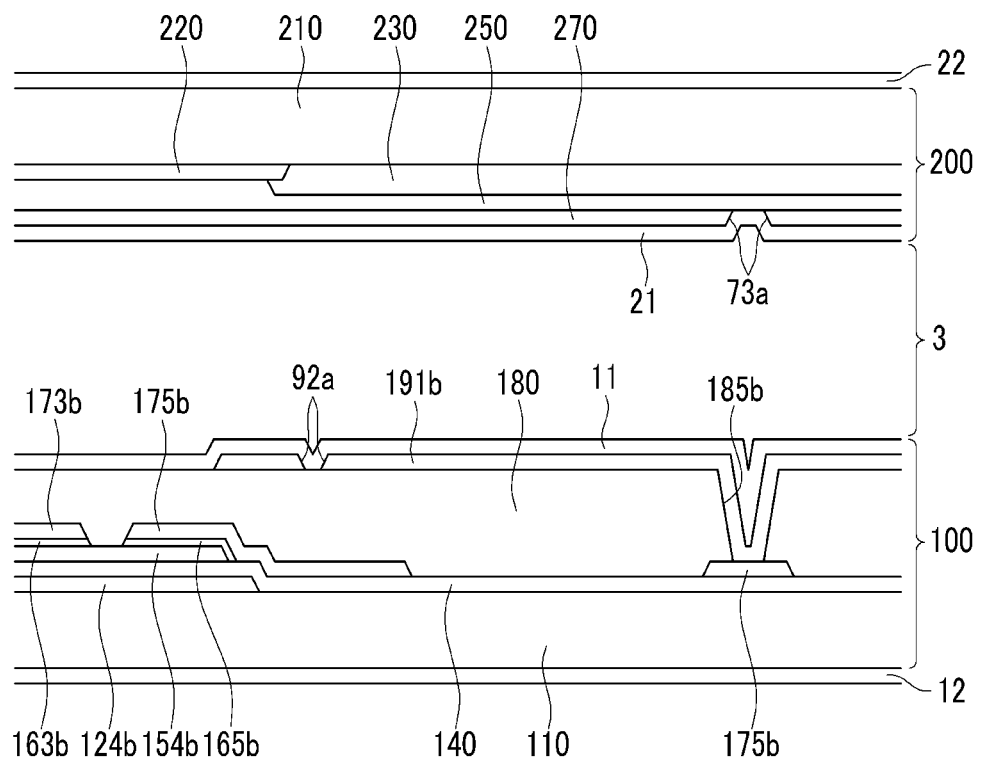
FIG. 5 and FIG. 6 are cross-sectional views taken along lines V-V and VI-VI in the exemplary liquid crystal panel assembly of FIG. 4, respectively.
Figure 6:
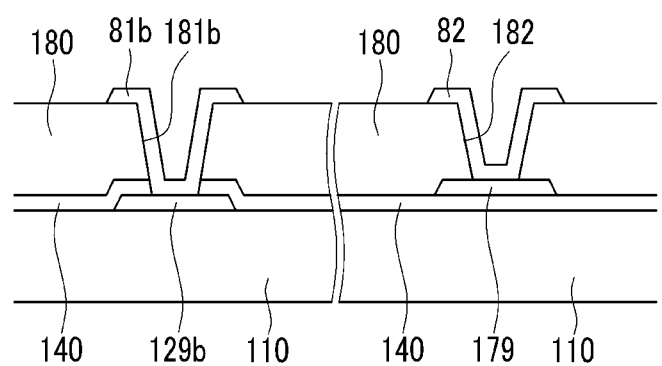

FIG. 4 is a layout view of an exemplary liquid crystal panel assembly according to one exemplary embodiment of the present invention, and FIG. 5 and FIG. 6 are cross-sectional views taken along lines V-V and VI-VI in the exemplary liquid crystal panel assembly of FIG. 4, respectively.

Referring to FIG. 4, the LCD according to the present exemplary embodiment includes first, second, third, and fourth pixels $PX_{n-1}$, $PX_n$, $PX_{n+1}$, and $PX_{n+2}$ adjacent to one another in the column direction, the second direction. The LCD according to the present exemplary embodiment will be described hereinafter based on the second pixel $PX_n$.

The LCD according to the present exemplary embodiment includes the lower and upper panels 100 and 200 facing each other, the liquid crystal layer 3 interposed between the lower and upper panels 100 and 200, and a pair of polarizers 12 and 22 attached to the outside of the lower and upper display panels 100 and 200, respectively.

First, the lower panel 100 will be described herein.

A plurality of gate conductors are disposed on an insulation substrate 110, the plurality of gate conductors including a plurality of first and second gate lines 121a and 121b, a plurality of storage electrode lines 131a, and a plurality of capacitance electrodes 131b. The first gate line 121a includes a first gate electrode 124a, a second gate electrode 124b, and an end portion 129a, and the second gate line 121b includes a third gate electrode 124c and an end portion 129b.

The storage electrode line 131a includes a first storage electrode 137a and a second storage electrode 137b expanded in the upper direction and the lower direction, such as toward the second gate line 121b and the first gate line 121a, respectively.

A gate insulating layer 140 is disposed on the gate conductors 121a, 121b, 131a, and 131b, and on exposed portions of the insulation substrate 110. First, second, and third semiconductor islands 154a, 154b, and 154c are disposed on the gate insulating layer 140. Moreover, a plurality of first ohmic contacts (not shown), second ohmic contacts 163b and 165b, and third ohmic contacts (not shown) are disposed on the semiconductor islands 154a, 154b, and 154c.

A data conductor is disposed on the ohmic contacts 163b and 165b and the gate insulating layer 140, the data conductor including a plurality of data lines 171, a plurality of first, second, and third drain electrodes 175a, 175b, and 175c, and first, second, and third electrode members 177a, 177b, and 173c.

The data line 171 includes a plurality of first and second source electrodes 173a and 173b, and an end portion 179 of a wide area for connecting with another layer or an external driving circuit.

A third source electrode is configured by the third electrode member 173c.

The first, second, and third drain electrodes 175a, 175b, and 175c may each include one end portion of a wide area and the other end portion of a bar type. The wide end portion of the first and second drain electrodes 175a and 175b is overlapped with the first and second storage electrodes 137a and 137b, and a portion of the bar-typed end portion is surrounded by the first and second source electrodes 173a and 173b. The third source electrode is configured by the third electrode member 173c. The wide end portion of the third drain electrode 175c is overlapped with the capacitance electrode line 131b, and the bar-typed end portion faces the third electrode member 173c, which serves as the third source electrode.

Each of first, second, third TFTs Qa, Qb, and Qc is configured by the first, second, and third gate electrodes 124a, 124b, and 124c, the first, second, and third source electrodes 173a, 173b, and 173c, and the first, second, and third drain electrodes 175a, 175b, and 175c together with the first, second, and third semiconductor islands 154a, 154b, and 154c, respectively. Each channel of the TFTs Qa, Qb, and Qc is formed at each of the semiconductor islands 154a, 154b, and 154c provided between each of the source electrodes 173a, 173b, and 173c and each of the drain electrodes 175a, 175b, and 175c.

The first and second electrode members 177a and 177b are overlapped with the first and second storage electrodes 137a and 137b, respectively.

A passivation layer 180 is disposed on the data conductors 171, 175a, 175b, 175c, 177a, 177b, and 173c and the exposed semiconductors 154a, 154b, and 154c, as well as on exposed portions of the gate insulating layer 140.

The passivation layer 180 is formed with contact holes 182, 185a, 185b, and 185c to expose the end portion 179 of the data line 171, the wide end portion of the first drain electrode 175a, the wide end portion of the second drain electrode 175b, and the wide end portion of the third electrode member 173c, and a plurality of contact holes 187a and 187b each exposing the first electrode member 177a and the second electrode member 177b. In addition, the passivation layer 180 and the gate insulating layer 140 are formed with a plurality of contact holes 181a and 181b each exposing the wide end portions 129a and 129b of the gate lines 121a and 121b.

A pixel electrode 191 including first and second sub-pixel electrodes 191a and 191b and a plurality of contact assistants 81a, 81b, and 82 are formed on the passivation layer 180.

The first and second sub-pixel electrodes 191a and 191b are engaged with each other in pairs with a gap 94 interposed therebetween, and the first sub-pixel electrode 191a is formed in a central region of the second sub-pixel electrode 191b. The gap 94 includes vertical and diagonal portions.

A center cutout 91 and lower and upper cutouts 92a and 92b are formed in the second sub-pixel electrode 191b. The center cutout 91 includes a pair of diagonal portions.

The diagonal portion of the gap 94, the diagonal portion of the center cutout 91, and the lower and upper cutouts 92a and 92b are formed at an angle of about 45 degrees with respect to the gate lines 121a and 121b.

The lower half of the pixel electrode 191 is divided into four parts through the lower cutout 92a, the center cutout 91, and the gap 94, and the upper half of the pixel electrode 191 is divided into four parts through the upper cutout 92b, the center cutout 91, and the gap 94. While a particular arrangement has been described, alternative exemplar embodiments may employ different arrangements. That is, at this time, the number of partitions or cutouts depends on design factors, for example the size of the pixel, the ratio of the horizontal length to the vertical length in the pixel electrode 191, the kind of the liquid crystal layer 3, or characteristics of the liquid crystal layer 3.

The first and second sub-pixel electrodes 191a and 191b are physically and electrically connected to the first and second drain electrodes 175a and 175b through the contact holes 185a and 185b to receive the data voltage from the first and second drain electrodes 175a and 175b. Furthermore, the second sub-pixel electrode 191b is physically and electrically connected to the third electrode member 173c, which serves as the third source electrode, through the contact hole 185c.

The first and second sub-pixel electrodes 191a and 191b for receiving the data voltage generate an electric field with a common electrode 270 of the upper panel 200 for receiving a common voltage to determine the direction of liquid crystal molecules in the liquid crystal layer 3 disposed between two electrodes 191 and 270. The polarization of light passing through the liquid crystal layer 3 depends on the direction of the liquid crystal molecules determined as described above. A liquid crystal capacitor is configured by the pixel electrode 191 and the common electrode 270 to sustain the applied voltage even after the TFT is turned off.

The first and second sub-pixel electrodes 191a and 191b are connected to the first and second electrode members 177a and 177b through the contact holes 187a and 187b. In order to reinforce voltage sustaining capability, the storage capacitors Csta and Cstb connected in parallel with the liquid crystal capacitors Clca and Clcb are formed with the first and second sub-pixel electrodes 191a and 191b, the first and second electrode members 177a and 177b, and the storage electrodes 137a and 137b connected to the first and second sub-pixel electrodes 191a and 191b, respectively. The first and second electrode members 177a and 177b are overlapped with the storage electrodes 137a and 137b.

A wide portion of the capacitance electrode line 131b and the wide end portion of the third drain electrode 175c are overlapped with each other with the gate insulating layer 140 interposed therebetween to form a step-down capacitor Cstd. Moreover, the third drain electrode 175c and the second sub-pixel electrode 191b are overlapped with each other with the passivation layer 180 interposed therebetween to form a step-up capacitor Cstu. The overlapping area of the capacitance electrode line 131b and the third drain electrode 175c is larger than that of the third drain electrode 175c and the second sub-pixel electrode 191b, and the thickness of the passivation layer 180 is greater than that of the gate insulating layer 140. Accordingly, the capacitance of the step-down capacitor Cstd is generally larger than that of the step-up capacitor Cstu.

The contact assistants 81a, 81b, and 82 are connected to the end portions 129a and 129b of the gate lines 121a and 121b and the end portion 179 of the data line 171 through the contact holes 181a, 181b, and 182, respectively. The contact assistants 81a, 81b, and 82 enhance adhesion of the end portions 129a and 129b of the gate lines 121a and 121b and the end portion 179 of the data line 171 to external devices and protect them.

An alignment layer 11 is disposed on the pixel electrode 191, the contact assistants 81a, 81b, and 82, and the passivation layer 180.

In the LCD according to one exemplary embodiment of the present invention, the second and third pixels $PX_n$ and $PX_{n+1}$ are adjacent to each other in the column direction, the second direction, to share the second gate line 121b. That is, the first and second gate electrodes 124a and 124b forming the first and second TFTs Qa and Qb for each of the second and third pixels $PX_n$ and $PX_{n+1}$ are connected to the same gate line 121a. This can increase the aperture ratio compared with the case for forming separately the gate line 121a connected to each pixel $PX_n$ and $PX_{n+1}$.

Furthermore, in the LCD according to one exemplary embodiment of the present invention, the first and second pixels $PX_{n-1}$, $PX_n$, and the third and fourth pixels $PX_{n+1}$, and $PX_{n+2}$ are adjacent to each other in the column direction to share the capacitance electrode line 131b between the pairs of adjacent pixels. That is, the third drain electrode 175c of each of the first and second pixels $PX_{n-1}$, $PX_n$, and the third drain electrode 175c of each of the third and fourth pixels $PX_{n+1}$, and $PX_{n+2}$ is overlapped with the same capacitance electrode line 131b This can reduce the aperture ratio compared with the case of separately forming the capacitance electrode line 131b connected to each pixel PX.

Now, the upper panel 200 will be described.

A light blocking member 220 is disposed on an insulation substrate 210. The light blocking member 220 may be referred to as a black matrix and prevents light leakage.

A plurality of color filters 230 are also disposed on the substrate 210. Most of the color filters 230 exist in the region surrounded by the light blocking member 220 and can extend long in the vertical direction along the column of the pixel electrode 191. Each of the color filters 230 can display one color in a set of colors, such as a set of primary colors such as three primary colors of red, green, and blue.

An overcoat 250 is disposed on the color filters 230 and the light blocking member 220.

A common electrode 270 is disposed on the overcoat 250. A set of cutouts 71, 72, 73a, 73b, 74a, and 74b is formed in the common electrode 270. Each cutout 71, 72, 73a, 73b, 74a, and 74b includes at least one diagonal portion extending in parallel with the cutouts 91, 92a, and 92b of the pixel electrode 191. A triangle notch may be formed at the diagonal portions of the cutouts 71, 72, 73a, 73b, 74a, and 74b.

An alignment layer 21 is applied over the common electrode 270.

The liquid crystal layer 3 has negative dielectric anisotropy, and the liquid crystal molecules of the liquid crystal layer 3 may be aligned so that a major axis thereof is vertical to the surface of the two display panels 100, 200 in the absence of an electric field.

When the liquid crystal capacitors Clca and Clcb are charged with electricity, an electric field substantially vertical to the surface of the display panels 100 and 200 is generated. The liquid crystal molecules respond to the electric field to change the direction so that their major axes are vertical to the direction of the electric field.

Meanwhile, the electric field is distorted by the cutouts 91, 92a, and 92b of the pixel electrode 191, the cutouts 71, 72, 73a, 73b, 74a, and 74b of the common electrode 270, and an oblique side of the pixel electrode 191, which is parallel to the cutouts, to form a horizontal component for determining a tilt direction of the liquid crystal molecules. The pixel electrode 191 and the common electrode are electric field generating electrodes. The horizontal component of the electric field is vertical to the oblique side of the cutouts 91, 92a, 92b, 71, 72, 73a, 73b, 74a, and 74b and the oblique side of the pixel electrode 191.

The pixel electrode 191 is divided into a plurality of sub-areas by the set of common electrode cutouts 71, 72, 73a, 73b, 74a, and 74b and the set of pixel electrode cutouts 91, 92a, and 92b, and each of the sub-areas has two major edges forming an oblique angle relative to the major edge of the pixel electrode 191. Since most of the liquid crystal molecules on each of the sub-areas incline in the direction vertical to the major edge, the inclination direction of the liquid crystal molecules is approximately four directions. As described above, due to various inclination directions of the liquid crystal molecules, a reference viewing angle of the LCD increases.

The operation of the LCD according to one exemplary embodiment of the present invention will be described hereinafter with reference to FIG. 7, FIG. 8, and the foregoing FIG. 1 to FIG. 3.

Figure 7:
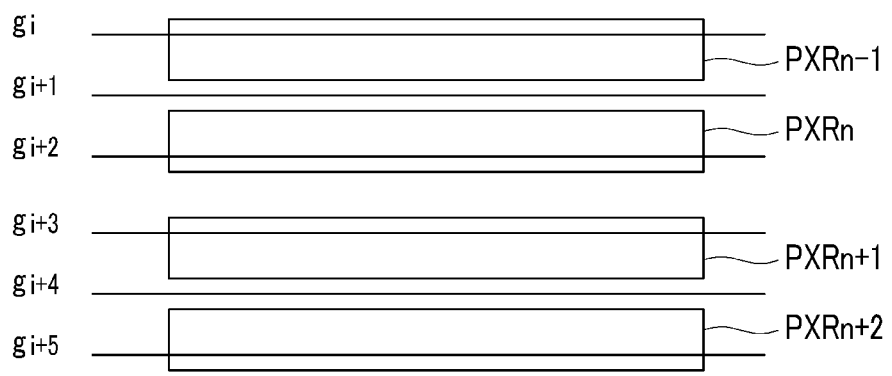
FIG. 7 is a view illustrating exemplary connection structures between pixel row and gate lines of the exemplary LCD according to one exemplary embodiment of the present invention.
Figure 8:
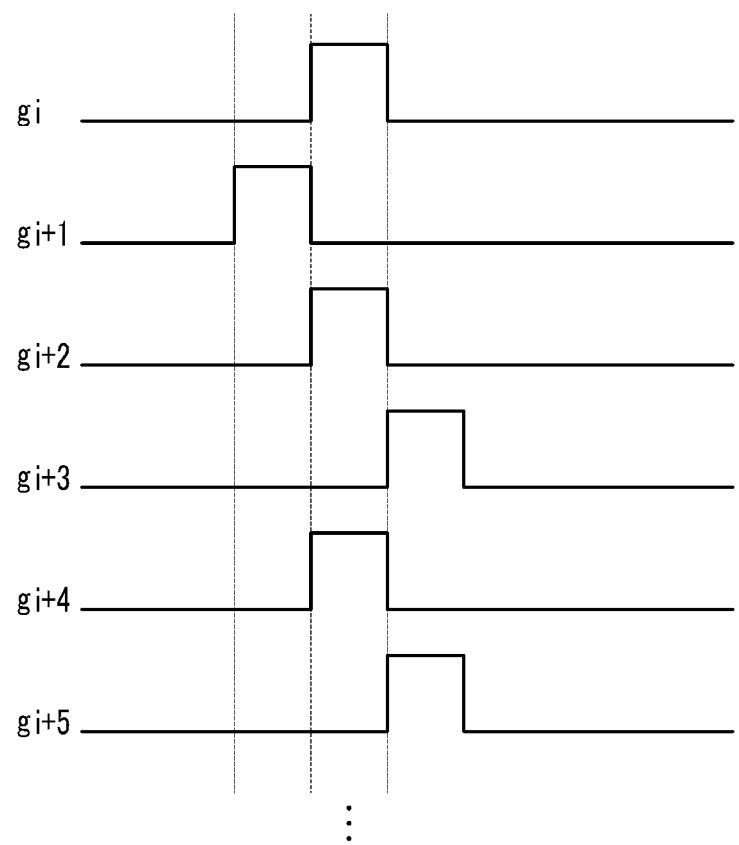
FIG. 8 is a waveform diagram illustrating gate signals of the exemplary LCD according to one exemplary embodiment of the present invention.

FIG. 7 is a view illustrating exemplary connection structures between pixel columns and gate lines of the exemplary LCD according to one exemplary embodiment of the present invention, and FIG. 8 is a waveform diagram illustrating gate signals of the exemplary LCD according to one exemplary embodiment of the present invention.

Referring first to FIG. 1, the signal controller 600 receives input image signals R, G, and B and input control signals for controlling these displays, from an external graphics controller (not shown). The input image signals R, G, and B involve luminance information of each pixel PX, and the luminance has the predetermined number of grays, for example $1024=2^{10}/256=2^8$, or $64=2^6$ grays. Examples of the input control signals are a vertical synchronization signal Vsync, a horizontal synchronizing signal Hsync, a main clock signal MCLK, and a data enable signal DE.

The signal controller 600 properly processes the input image signals R, G, and B to match an operating condition of the liquid crystal panel assembly 300 based on the input image signals R, G, and B and the input control signals. Moreover, the signal controller 600 generates a gate control signal CONT1 and a data control signal CONT2, sends the gate control signal CONT1 to the gate driver 400, and sends the data control signal CONT2 and the processed image signal DAT to the data driver 500. An output image signal DAT, a digital signal, has a value (or gray) of a predetermined number.

The data driver 500 receives the digital image signal DAT for the pixel PX of one row according to the data control signal CONT2 generated by the signal controller 600 and selects the gray voltage corresponding to each digital image signal DAT. Then, the data driver 500 converts the digital image signal DAT into an analog data voltage to apply the converted digital image signal to a relevant data line DL.

The gate driver 400 applies a gate-on voltage Von to gate lines GLa and GLb according to the gate control signal CONT1 generated by the signal controller 600 to turn on switching elements Qa, Qb, and Qc connected to these gate lines GLa and GLb. In that case, a data voltage Vd applied to the data line DL is applied to the relevant pixel PX through the first and second switching elements Qa and Qb turned on by the gate driver 400.

A specific pixel row, for example focusing on the n-th pixel row and the (n+1)-th pixel row, will be described below.

Referring to FIG. 7, in the LCD according to one exemplary embodiment of the present invention, the (n−1)-th pixel row $PXR_{n-1}$ is connected to the i-th gate line $G_i$, the n-th pixel row $PXR_n$ is connected to the (i+2)-th gate line $G_{i+2}$, and the (n−1)-th pixel row $PXR_{n-1}$ and the n-th pixel row $PXR_n$ are connected to the (i+1)th gate line $G_{i+1}$ in common. In addition, the (n+1)-th pixel row $PXR_{n+1}$ is connected to the (i+3)-th gate line $G_{i+3}$, the (n+2)-th pixel row $PXR_{n+2}$ is connected to the (i+5)-th gate line $G_{i+5}$, and the (n+1)-th pixel row $PXR_{n+1}$ and the (n+2)-th pixel row $PXR_{n+2}$ are connected to the (i+4)-th gate line $G_{i+4}$ in common.

Referring to FIG. 8, when a gate signal $g_{i+1}$ applied to the (i+1)-th gate line $G_{i+1}$ is changed into a gate-on voltage Von from a gate-off voltage Voff, the first and second switching elements Qa and Qb corresponding to each of the (n−1)-th pixel row $PXR_{n-1}$ and the n-th pixel row $PXR_n$ connected to the (i+1)-th gate line $G_{i+1}$ are turned on. Thus, the data voltage Vd applied to the data line 171 is applied to the first and second sub-pixel electrodes 191a and 191b corresponding to each of the (n−1)-th pixel row $PXR_{n-1}$ and the n-th pixel row $PXR_n$ through the first and second switching elements Qa and Qb that are turned on. At this time, the same data voltage Vd is applied to the first and second sub-pixel electrodes 191a and 191b. The first and second liquid crystal capacitors Clca and Clcb are charged with the same value as a difference between the common voltage and the data voltage Vd.

Then, when the gate signal $g_{i+1}$ is changed into the gate-off voltage Voff from the gate-on voltage Von and at the same time the gate signal $g_i$ applied to the i-th gate line $G_i$ and the gate signal $g_{i+2}$ applied to the (i+2)-th gate line $G_{i+2}$ are changed into the gate-on voltage Von from the gate-off voltage Voff, the first and second switching elements Qa and Qb corresponding to each of the (n−1)-th pixel row $PXR_{n-1}$ and the n-th pixel row $PXR_n$ are turned off, and the third switching element Qc is turned on. Then, electrical charges move from the second sub-pixel electrode 191b to the third drain electrode 175c through the third switching element Qc. For this reason, the charging voltage of the second liquid crystal capacitor Clcb is lowered, and the step-down capacitor Cstd and the step-up capacitor Cstu are charged with electricity. Then, when a second gate signal $g_{bi}$ is changed into the gate-off voltage Voff from the gate-on voltage Von, the third switching element Qc is turned off, and the step-up capacitor Cstu is floated. Therefore, the charging voltage of the second liquid crystal capacitor Clcb rises to the charging voltage of the step-up capacitor Cstu. However, since the capacitance of the step-down capacitor Cstd is higher than that of the step-up capacitor Cstu, the charging voltage of the second liquid crystal capacitor Clcb is lowered compared with that of the first liquid crystal capacitor Clca.

At this time, the charging voltages of two liquid crystal capacitors Clca and Clcb show different gamma curves, and the gamma curve of one pixel voltage is a curved line synthesized from these different gamma curves. The synthetic gamma curve in the front should be corrected so as to conform to most suitable reference gamma curve in the front, and the synthetic gamma curve in the side should be corrected so as to be extremely close to the reference gamma curve in the front. As described above, due to conversion of the image data, side visibility is improved.

Meanwhile, a gate signal $g_{i+1}$ applied to the (i+1)-th gate line $G_{i+1}$ is changed into the gate-off voltage Voff from the gate-on voltage Von, and a gate signal $g_{i+4}$ applied to the (i+4)-th gate line $G_{i+4}$ is changed into the gate-on voltage Von from the gate-off voltage Voff, at the same time. Moreover, the gate signal $g_i$ applied to the i-th gate line $G_i$ and the gate signal $g_{i+2}$ applied to the (i+2)-th gate line $G_{i+2}$ are changed into the gate-off voltage Voff from the gate-on voltage Von, and the gate signal $g_{i+3}$ applied to the (i+3)-th gate line $G_{i+3}$ and the gate signal $g_{i+5}$ applied to the (i+5)-th gate line $G_{i+5}$ are changed into the gate-on voltage Von from the gate-off voltage Voff, at the same time. Thus, the operation of the (n+1)-th pixel row $PXR_{N+1}$ and the (n+2)-th pixel row $PXR_{N+2}$ is performed in the same manner as the (n−1)-th pixel row $PXR_{N-1}$ and the (n)-th pixel row $PXR_N$.

By repeating the above procedure by a unit of one horizontal period which is denoted by "1H" and is equal to one period of a horizontal synchronizing signal Hsync and a data enable signal DE, a data voltage Vd is applied to all pixels PXs to display an image of one frame.

When the next frame starts after finishing one frame, the state of an inversion signal RVS applied to the data driver 500 is controlled such that the polarity of the data voltage Vd applied to each pixel PX is opposite to that of the previous frame.

As described above, the gate signals for controlling the first and second switching elements Qa and Qb are identically applied to two pixels adjacent to each other, and the gate signal applied to the third switching element Qc is also identically applied to two pixels adjacent to each other. Then, time for sustaining the gate-on voltage is prolonged from 1H to 2H. Accordingly, during high driving, the charging time of each switching element can be ensured.

Now, an exemplary LCD according to another exemplary embodiment of the present invention will described in detail with reference to FIG. 9 and FIG. 10.

Figure 9:
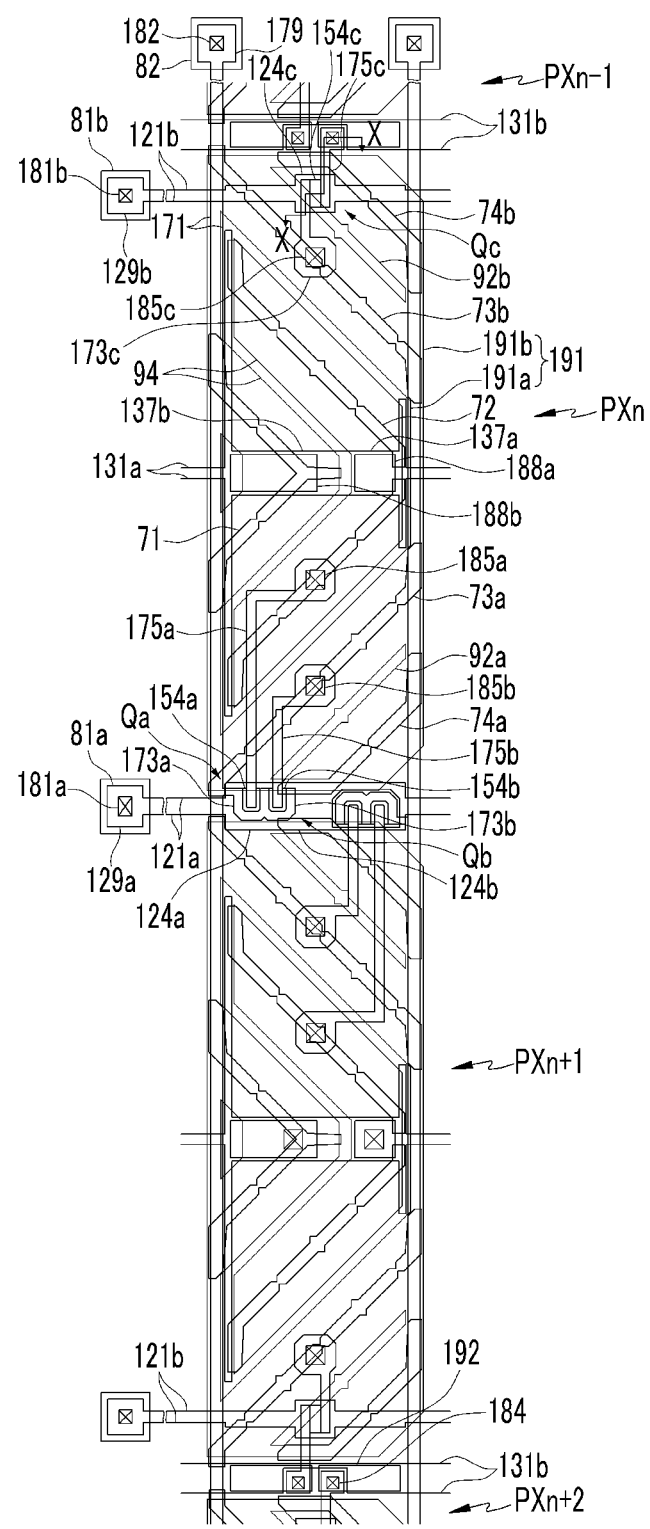
FIG. 9 is a layout view of an exemplary LCD according to another exemplary embodiment of the present invention; and, FIG. 10 is a cross-sectional view taken along line X-X in the exemplary LCD of FIG. 9.
Figure 10:
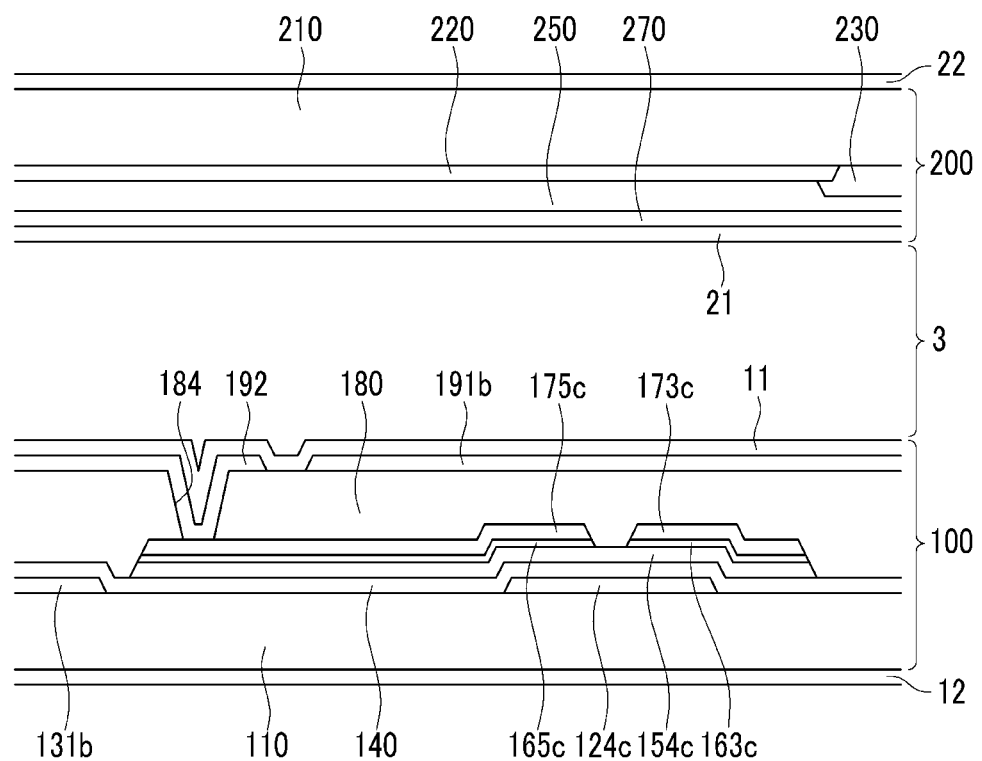

FIG. 9 is a layout view of the exemplary LCD according to another exemplary embodiment of the present invention, and FIG. 10 is a cross-sectional view taken along line X-X in the exemplary LCD of FIG. 9.

Referring to FIG. 9 and FIG. 10, a liquid crystal panel assembly according to the present exemplary embodiment includes a lower panel 100, an upper panel 200, and a liquid crystal layer 3 disposed therebetween.

According to the present exemplary embodiment, a layered structure of the liquid crystal panel assembly is generally the same as that of the liquid crystal panel assembly illustrated in FIG. 4 to FIG. 6.

First, the lower panel 100 will be described. A plurality of gate conductors are disposed on an insulation substrate 110, the plurality of gate conductors including a plurality of first and second gate lines 121a and 121b, a plurality of storage electrode lines 131a, and a plurality of capacitance electrodes 131b. A gate insulating layer 140 is disposed on the gate conductors 121a, 121b, 131a, and 131b, and on exposed surfaces of the insulation substrate 110. A plurality of semiconductors 154a, 154b, and 154c are disposed on the gate insulating layer 140. Moreover, a plurality of ohmic contacts 163c and 165c are disposed on the plurality of semiconductors 154a, 154b, and 154c. A data conductor is formed on the ohmic contacts 163c and 165c, the data conductor including a plurality of data lines 171 and a plurality of first, second, and third drain electrodes 175a, 175b, and 175c. A passivation layer 180 is disposed on the data conductors 171, 175a, 175b, and 175c and the exposed semiconductors 154a, 154b, and 154c, and may be further formed on exposed portions of the gate insulating layer 140, and a plurality of contact holes 181a, 181b, 182, 185a, 185b, and 185c are formed in the passivation layer 180 and the gate insulating layer 140. A plurality of pixel electrodes 191 including first and second sub-pixel electrodes 191a and 191b and a plurality of contact assistants 81a, 81b, and 82 are disposed on the passivation layer 180, and an alignment layer 11 is disposed on the pixel electrodes 191, the contact assistants 81a, 81b, and 82, and the passivation layer 180.

Now, the upper panel 200 will be described. A light blocking member 220, a plurality of color filters 230, an overcoat 250, a common electrode 270, and an alignment layer 21 are disposed on an insulation substrate 210.

However, unlike the liquid crystal panel assembly illustrated in FIG. 4 to FIG. 6, the semiconductors 154a, 154b, and 154c are extended along the data line 171 and the drain electrodes 175a, 175b, and 175c to form a linear semiconductor (not shown), respectively, and the ohmic contacts 163c and 165c are extended along the data line 171 to form a linear ohmic contact (not shown), respectively. The linear semiconductor has substantially the same planar shape as the data line 171, the drain electrodes 175a, 175b, and 175c, and the ohmic contacts 163c and 165c disposed thereon.

In an exemplary method of manufacturing this TFT array panel according to one exemplary embodiment of the present invention, the data line 171, the drain electrodes 175a, 175b, and 175c, the semiconductors 154a, 154b, and 154c, and the ohmic contacts 163c and 165c are formed by a single photolithography process.

A photosensitive film used in this photolithography process differs in thickness according to location, and particularly includes a first portion and a second portion in the order in which the thickness becomes smaller. The first portion is located at a wiring region provided with the data line 171 and the drain electrodes 175a, 175b, and 175c, and the second portion is located at a channel region of the TFTs Qa, Qb, Qc.

There are many methods of forming the difference in thickness according to the location of the photosensitive film. One exemplary method includes forming a photomask with a translucent area as well as a light transmitting area and a light blocking area. The translucent area is provided with a slit pattern, a lattice pattern, or a thin film having medium transmittance or thickness. In the case of utilizing the slit pattern, it is preferable that the slit width or the space between the slits is smaller than the resolution of exposure equipment used in the photolithography process. Another exemplary method includes using a reflowable photosensitive film. That is, the method is to form a thin portion by making the photosensitive film flow into the region where the photosensitive film does not remain, after forming the reflowable photosensitive film with a general exposure mask having only the light transmitting area and the light blocking area.

Since this reduces time for the photolithography process, the manufacturing method is simplified.

In addition, the liquid crystal panel assembly according to the present exemplary embodiment includes a fourth electrode member 192 overlapped with the capacitance electrode line 131b, unlike FIG. 4 to FIG. 6. The fourth electrode member 192 is formed of the same material as the pixel electrode 191, and the fourth electrode member 192 and the pixel electrode 191 are disposed in the same layer.

In the passivation layer 180, a contact hole 184 exposing the third drain electrode 175c is formed, and openings 188a and 188b exposing the gate insulating layer 140 and overlapped with the first and second storage electrodes 137a and 137b are formed.

The fourth electrode member 192 and the third drain electrode 175c are physically and electrically connected to each other through the contact hole 184, and the step-down capacitor Cstd is formed with the fourth electrode member 192 and the capacitance electrode line 131b, with the gate insulating layer 140 and the passivation layer 180 interposed therebetween. If the step-down capacitor Cstd is formed between the third drain electrode 175c and the capacitance electrode 131b, the semiconductor exists between both terminals. If so, the semiconductor functions as an insulator or a conductor as occasion demands, and the capacitance of the step-down capacitor Cstd non-constantly varies. Therefore, since the charging voltage of the second liquid crystal capacitor Clcb varies as occasion demands, it is difficult to precisely adjust the charging voltage of the first and second liquid crystal capacitors Clca and Clcb as intended. However, since the semiconductor is not interposed between both terminals of the step-down capacitor Cstd in the exemplary embodiment of FIG. 9 and FIG. 10, the capacitance of the step-down capacitor Cstd is uniformly sustained. Accordingly, it can be possible to precisely adjust the charging voltage of the first and second liquid crystal capacitor Clca and Clcb.

As described above, in order to connect the third drain electrode 175c with the fourth electrode member 192 through the contact hole 184 and to form the step-down capacitor Cstd between the fourth electrode member 192 and the capacitance electrode line 131b, sufficient space is required between each pixel PX. According to the present exemplary embodiment, since the capacitance electrode line 131b is disposed between two pixels $PX_{n-1}$ and $PX_n/PX_{n+1}$ and $PX_{n+2}$ adjacent to one another to be connected to two pixels $PX_{n-1}$ and $PX_n/PX_{n+1}$ and $PX_{n+2}$ in common, it is possible to reduce the occupied area of the capacitance electrode line 131b. Therefore, the liquid crystal panel assembly having the configuration of FIG. 9 and FIG. 10 can be designed without an amount of reduction in the aperture ratio.

Furthermore, in the liquid crystal panel assembly of FIG. 9 and FIG. 10, the pixel electrode 191 is overlapped with the storage electrode line 131a as well as the first and second storage electrodes 137a and 137b with the gate insulating layer 140 interposed therebetween to form the storage capacitor Csta and Cstb, unlike the liquid crystal panel assembly of FIG. 4 to FIG. 6. At this time, since the openings 188a and 188b are formed in the passivation layer 180, only the gate insulating layer 140 exists between the pixel electrode 191 and the storage electrodes 137a and 137b, and the distance between the pixel electrode 191 and the storage electrode line 131a becomes shorter. For this reason, the voltage sustaining capability is improved. In addition, since the semiconductor is not interposed between both terminals of the storage capacitor Csta, Cstb, it is possible to uniformly sustain the capacitance of the storage capacitor.

Although exemplary embodiments of the present invention have been described in detail, the scope of the present invention is not limited hereto. Various changes and modifications using the principle of the present invention as defined in the appended claims are also included in the scope of the present invention.

What is claimed is:

1. A liquid crystal display including a first pixel, a second pixel, and a third pixel adjacent to one another in a column direction, the liquid crystal display comprising:
   a first gate line connected to each of the second pixel and the third pixel in common;
   a second gate line connected to the second pixel;
   a capacitance electrode line connected to each of the first pixel and the second pixel in common;
   a first data line connected to the second pixel;
   a second data line connected to the first pixel and the third pixel; and
   a step-up capacitor having one terminal connected to a first terminal of a switching element of the third pixel and the other terminal is directly connected to a liquid crystal capacitor of the third pixel and a second terminal of the switching element,
   wherein the capacitance electrode line is disposed between the second gate line and an adjacent gate line connected to the first pixel.

2. The liquid crystal display of claim 1, further comprising:
   a third gate line connected to the third pixel.

3. The liquid crystal display of claim 2, wherein:
   each of the first pixel, the second pixel, and the third pixel comprises a pixel electrode comprising a first sub-pixel electrode and a second sub-pixel electrode, a first thin film transistor connected to the first sub-pixel electrode, a second thin film transistor connected to the second sub-pixel electrode, and a third thin film transistor connected to the second sub-pixel electrode; and a gate electrode of the first thin film transistor and a gate electrode of the second thin film transistor comprised in each of the second and third pixels is connected to the first gate line, and a drain electrode of the third thin film transistor comprised in each of the first pixel and the second pixel is overlapped with the capacitance electrode line.

4. The liquid crystal display of claim 3, wherein a drain electrode of each of the first thin film transistor, the second thin film transistor, and the third thin film transistors comprised in the second pixel has 180° rotational symmetry with respect to a drain electrode of each of the first thin film transistor, the second thin film transistor, and the third thin film transistor comprised in the third pixel.

5. The liquid crystal display of claim 3, further comprising a semiconductor layer disposed between a layer containing the first gate line, the second gate line, and the third gate line and a layer containing the first data line and the second data line, wherein the semiconductor layer has substantially a same planar shape as the first data line and second data line except for a channel of the first thin film transistor, the second thin film transistor, and the third thin film transistor in each pixel.

6. The liquid crystal display of claim 5, further comprising an electrode member overlapped with the capacitance electrode line and including a same material as the pixel electrode, wherein the electrode member is electrically connected to a drain electrode of the third thin film transistor of the second pixel.

7. The liquid crystal display of claim 3, wherein the first thin film transistor and the second thin film transistor are simultaneously turned on, and after the first thin film transistor and the second thin film transistor are turned off, the third thin film transistor is turned on.

8. The liquid crystal display of claim 7, wherein the first thin film transistor and the second thin film transistor included in each of the second pixel and the third pixel are simultaneously turned on, and the third thin film transistors respectively comprised in the first pixel and the second pixel are simultaneously turned on.

9. The liquid crystal display of claim 7 wherein liquid crystal capacitors connected to the first subpixel electrode and the second subpixel electrode receive a same charging voltage as each other when the first thin film transistor and the second thin film transistor are turned on and receive different charging voltages from each other when the third thin film transistor is turned on.

10. The liquid crystal display of claim 1, wherein the second pixel is arranged between the first pixel and the third pixel, and the first pixel and the third pixel are symmetrical to each other.

11. The liquid crystal display of claim 10, wherein the second pixel and the third pixel have 180° rotational symmetry with respect to each other.

12. A liquid crystal display including first, second, and third pixels adjacent to one another in a column direction, the liquid crystal display comprising:

a plurality of first gate lines transmitting a first gate signal;

a plurality of second gate lines transmitting a second gate signal; and a plurality of data lines transmitting a data voltage, wherein each of the first to third pixels comprises a first sub-pixel connected to one of the first gate lines and one of the data lines, and a second sub-pixel connected to the one of the first gate lines, one of the second gate lines, and the one of the data lines;

the first sub-pixel comprises a first switching element connected to the one of the first gate lines and the one of the data lines, and a first liquid crystal capacitor and a first storage capacitor connected to the first switching element;

the second sub-pixel comprises a second switching element connected to the one of the first gate lines and the one of the data lines, a second liquid crystal capacitor and a second storage capacitor connected to the second switching element, a third switching element connected to the one of the second gate lines and the second liquid crystal capacitor, and a step-down capacitor connected to the third switching element;

the first sub-pixel comprised in each of the second and third pixels is connected to a same first gate line in the plurality of first gate lines; and a step-up capacitor having one terminal connected to a first terminal of the third switching element and the other terminal is directly connected to the second liquid crystal capacitor and a second terminal of the third switching element.

13. The liquid crystal display of claim 12, further comprising a plurality of capacitance electrode lines forming one terminal of the step-down capacitor, wherein the second sub-pixel comprised in each of the first and second pixels is connected to a same capacitance electrode line in the plurality of capacitance electrode lines.

14. The liquid crystal display of claim 13, wherein the first and second switching elements are simultaneously turned on, and after the first and second switching elements are turned off, the third switching element is turned on.

15. The liquid crystal display of claim 14, wherein the first and second switching elements comprised in each of the second and third pixels are simultaneously turned on, and the third switching elements respectively comprised in the first and second pixels are simultaneously turned on.

16. The liquid crystal display of claim 13, wherein the second and third pixels have 180° rotational symmetry with respect to each other.

17. The liquid crystal display of claim 12, wherein input terminal of the third switching element is connected to the second liquid crystal capacitor and the step-up capacitor.

18. The liquid crystal display of claim 12, wherein the one terminal of the step-up capacitor is directly connected to the third switching element and the other terminal of the step-up capacitor is directly connected to the second liquid crystal capacitor.

* * * * *